United States Patent [19]

Rütschle et al.

[11] Patent Number: 4,863,320
[45] Date of Patent: Sep. 5, 1989

[54] MACHINE TOOL

[75] Inventors: Eugen Rütschle, Mühlheim; Hans-Henning Winkler, Tuttlingen; Rudolf Haninger, Seitingen, all of Fed. Rep. of Germany

[73] Assignee: Chiron-Werke GmbH & Co. KG, Tittlingen, Fed. Rep. of Germany

[21] Appl. No.: 17,842

[22] Filed: Feb. 24, 1987

[30] Foreign Application Priority Data

Feb. 25, 1986 [DE] Fed. Rep. of Germany ....... 3605983

[51] Int. Cl.$^4$ ........................................... B23Q 11/08
[52] U.S. Cl. ..................................... 409/134; 74/614; 408/241 G
[58] Field of Search ................... 409/134; 408/241 G; 74/613, 614; 192/132, 135, 133

[56] References Cited

FOREIGN PATENT DOCUMENTS 2503036 1/1975 Fed. Rep. of Germany.
3007683 9/1981 Fed. Rep. of Germany ...... 192/133
3320738 6/1983 Fed. Rep. of Germany.

Primary Examiner—Z. R. Bilinsky
Attorney, Agent, or Firm—Pretty, Schroeder, Brueggemann & Clark

[57] ABSTRACT

A machine tool is provided with an enclosure with a charging door (10) arranged therein. In a first end position, the charging door closes the enclosure against the outside while in a second end position it occupies a position in which it is pivoted substantially about a horizontal axis in its upper portion. In this latter position, the lower rim of the charging door (10) is displaced into the interior of the enclosure. The charging door (10) is guided during its movement in such a manner that its lower edge is located at a higher level between the two end positions than in the said end positions.

In order to facilitate opening and closing of the door for an operator, a power-operated drive (95, 100, 101) is arranged in a lateral bay (90) in the enclosure for opening and closing the charging door (10).

8 Claims, 4 Drawing Sheets

MACHINE TOOL

The present invention relates to a machine tool having a cover with a charging door arranged therein which, in a first end position, closes the cover against the outside and, in a second end position, occupies a position in which it is pivoted about a horizontal axis in its upper portion, the lower rim of the charging door being guided during its movement in such a manner that its lower edge is located at a higher level between the two end positions than in the said end positions, the cover comprising two symmetrical wall portions tapering upwardly and forwardly towards the charging door.

A machine tool of this type has been known already from German Disclosure Document No. 33 20 738.

The known machine tool is a numerically controlled machining center, in particular for performing drilling and milling work on metallic workpieces. The machine tool comprises a cover with a door which prevents drilling coolant, chips and the like from splashing around about the machine tool during processing of the workpieces, a fact which is of particular importance in view of the high cutting speeds of modern machining centers.

The charging door of the known machine tool is suspended in such a manner that during the opening motion its lower edge is guided upwardly, clear of the workpiece mounted on the working table. In the opened condition, the charging door therefore occupies a position between the workpiece and the headstock arranged behind the latter.

It has been found, however, that it can be very tiring for the user, in particular when rapid workpiece changes are to be carried out, to open and close an upwardly pivoting charging door in rapid succession along a complicated curve.

From German Disclosure Document No. 25 03 036 it has been known generally to equip a metal-working machine, in particular a punch or press, with a protective enclosure comprising a power-operated drive for actuating an element of the enclosure. In the case of this known device, a door opening in forward direction is arranged on the head portion of a press, at a distance above the machine bed. The door can be pivoted about hinges arranged one above the other along its lateral edge. A slide can be extended downwardly beyond the lower edge of the door. The slide is actuated by a piston/cylinder unit arranged in the hinged door. In the downwardly extended condition of the slide, the latter is supplemented by two hinged lateral walls adjoining the door laterally at an angle of 90° so that the mounting space of the tool is enclosed on three sides. For changing the tool, the slide is retracted upwardly, and the two lateral walls are folded down. In addition, the door can be pivoted forwardly, in the retracted condition of the slide. The known device, i.e. the door comprising the drive for the slide and the lateral side walls, can be retrofitted, either by fitting it completely on machines which did not have any such device, or by exchanging the existing devices on machines that had been equipped already with similar arrangements.

Accordingly, the known machine comprises two independent enclosure elements, namely on the one hand the forwardly opening door and, on the other hand, the vertically movable slide. Retrofitting is only possible if the complete door unit, including the power-operated drive for the slide, is attached or substituted for an existing enclosure. The known device is, therefore, not suited for machines which comprise only one pivoted enclosure element which in addition has to remain clear of any installations because it must be possible to observe the machining processes performed by the machine tool visually through the door, in particular by giving the user of the machine tool a clear view of the machining area. This is of course a less important aspect for presses because—unlike the situation in the case of metal-cutting machine tools, such as milling or drilling centers—the deformation process occurs in this case during closing of the dies so that it is anyway not possible to observe the workpiece during the pressing process.

Now, it is the object of the present invention to improve a machine tool of the type described above in such a manner that the user of the machine is released, in the manner known as such, from tiring work in connection with the opening and closing of the charging door, without there being a need to change the door as such so that the advantages of known doors, in particular the possibility to observe the working space, are preserved.

This object is achieved according to the invention by an arrangement in which a power-operated drive for opening and closing the charging door is provided in the known manner, that the power-operated drive is arranged in a lateral bay of the cover and that the power-operated drive, together with a holder and preferably the lateral bay, are designed in the form of an insert to be fitted in a window opening of the wall portion.

This solves the object underlying the invention completely and perfectly because the power-operated drive, which may be started for example by a switch arranged in a handle, eases the work for the user of the machine tool notably relieving him from the necessity to open and close the door frequently by his own strength.

By accommodating the power-operated drive in the lateral bay of the cover it is ensured at the same time that there are no additional or bulky parts by which the user of the machine could get caught, for example by his overall.

It is an additional advantage of these features that even existing machine tools can be retrofitted with the power-operated drive because all elements required for moving the charging door by power can be fitted in a window opening of the wall portion which is anyway normally provided.

According to another preferred embodiment of the invention, the power-operated drive comprises a servomotor and the charging door is turned by the shaft of the said servomotor via a first actuating arm.

This feature provides the advantage that, unlike arrangements in which pivoting is effected for example by toothed racks or cable controls or the like, the power-operated drive can be given a very compact design, and in addition the pivoting speed of the door can be preselected by a suitable speed setting.

According to another preferred embodiment of the invention, a second actuating arm is provided on the shaft and bears against a stationary stop in at least one end position of the motor-operated drive.

This feature provides the advantage that the charging door is moved safely to its respective end positions, it being further possible to provide suitable limit switches for switching off the power-operated drive in these end positions. Another embodiment of the invention is characterized by the fact that a servomotor and a control for the said servomotor are arranged on a mounting plate extending across the bay.

This embodiment also provides the advantage that existing machine tools can be retrofitted easily, and in addition these designs do not require important changes to be made on existing designs. Finally, it is an advantage of these features that the entire power-operated drive can be removed easily for maintenance purposes or the like.

According to certain embodiments of the invention, the door may be guided in suitable guide rails which may, conveniently, be designed in such a manner that they do not project into the interior of the enclosure when the door is in its first position in which the enclosure is fully closed.

One embodiment of the invention provides, however, that the door is guided in its lower portion by a first pair of guide rods which are hinged on the one hand at the door and on the other hand at the stationary part of the enclosure, and that the door is guided by another pair of guide rods hinged on the one hand in the upper area of the door and on the other hand on the stationary part of the enclosure, and that the pivoting path of the said second pair of guide rods is limited to obtain a forced inversion point, while maintaining the pivoting movement of the first pair of guide rods unchanged.

The advantage of these features is seen in the fact that the guide rods can be very simple and arranged in a space-saving manner and that no particular measures are required to prevent the guide rods from projecting far into the interior of the enclosure when the door is in its first end position. The second pair of guide rods reaches its inversion point of the pivoting movement approximately at the moment when the upper edge of the door occupies the highest position that can be reached during the pivoting operation.

According to another embodiment of the invention it may be an advantage if the second pair of guide rods extends substantially vertically in this position. We are speaking here of pairs of guide rods because the guide rods are arranged conveniently on both sides of the door so that the latter can be guided with particular ease and precision.

The length of the guide rods may be selected as desired, depending on the path through which the lower edge of the door is to travel. The same applies to the position which the pairs of guide rods are to occupy relative to each other, for example in the first end position. In the embodiment shown, the arrangement is such that the length of the two pairs of guide rods is not exactly, but only almost equal and that their position in the door is not exactly parallel.

Considering that the door as a whole must be lifted in the course of its movement between the two end positions, a weight-relieving device is provided according to one embodiment of the invention. According to a further improvement of the invention, an important component of this weight-relieving device consists in a spring which is tensioned in both end positions of the charging door (though not necessarily at equal force in both end positions) and which may exhibit the least tension for example when the point of gravity of the door has reached its highest position. The advantage of such a spring lies in the fact that it acts without any external energy supply and that in addition, when the door has passed its highest point and approaches its other end position, the spring is tensioned again and prevents in this manner an abrupt transition into the other end position which could give rise to undesirable noise. This arrangement, therefore, permits drive motors of relatively low power to be used for moving the door, and in case of emergency the door can be opened or closed by an operator manually without much force.

The spring can be accommodated in a particularly favorable manner, according to one embodiment of the invention, when it acts upon the upper guide rods, i.e. upon the second pair of guide rods. One embodiment of the invention provides for this purpose that an arm, which is engaged by the said spring, is arranged on the second pair of guide rods and that the spring is arranged advantageously in a substantially horizontal position. In a particularly simple arrangement, the spring may be designed as a helical tension spring.

In order to ensure perfect synchronism between the guide rods provided on the left and the right sides of the charging door, it is provided according to one embodiment of the invention that the two guide rods of the second pair of guide rods are fixed against rotation on a shaft interconnecting them and that the before-mentioned arm which is engaged by the spring is arranged on this shaft.

The same shaft may, advantageously, carry limit switches which are capable of detecting the position occupied by the charging door at any time, in order to influence the operation of the machine tool in response to such position.

Other features and advantages of the invention will become apparent from the following description of one embodiment of the invention and the drawing, which shows certain details essential to the invention, and from the claims. The individual features may be used in any embodiment of the invention either individually or in any desired combination thereof. In the drawing FIG. 1 shows a perspective overall view of a machine tool, with its enclosure and charging door;

Figure 1:
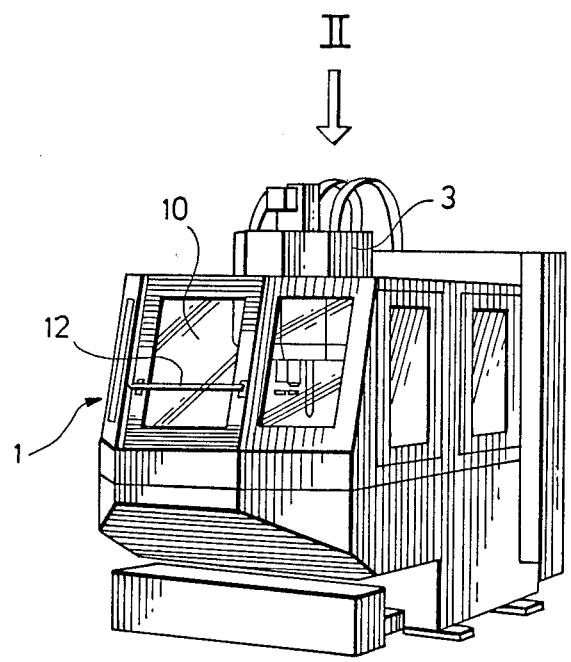

The enclosure 1 visible in FIG. 1 encloses a numerically controllable machine tool having a headstock 3 that can be moved in horizontal and vertical direction and a tool spindle whose axis of rotation extends in vertical direction. One side of the enclosure 1, which will be described as the front for the purposes of this specification, is provided with a charging door 10 which in the representation of FIG. 1 is shown in its first end position in which it prevents any access to the interior of the enclosure 1 and protects the surroundings of the machine tool from splashing drilling coolant or chips. The charging door 10 carries on its outside, in its lower third, a horizontally extending bar 12 serving as handle when the door is to be opened manually. In addition, the door is preferably equipped, near the bar 12, with a switch—not shown in the drawing—permitting the charging door 10 to be moved by an electric motor in a manner that will be described further below. Accordingly, the bar 12 is intended in the first line to permit the door to be opened or closed manually in case of failure of the electric supply voltage.

Just as the remaining parts of the enclosure 1, the charging door 10 is also provided with a glazed portion to facilitate the supervision of the working processes by the operator.

Figure 2:
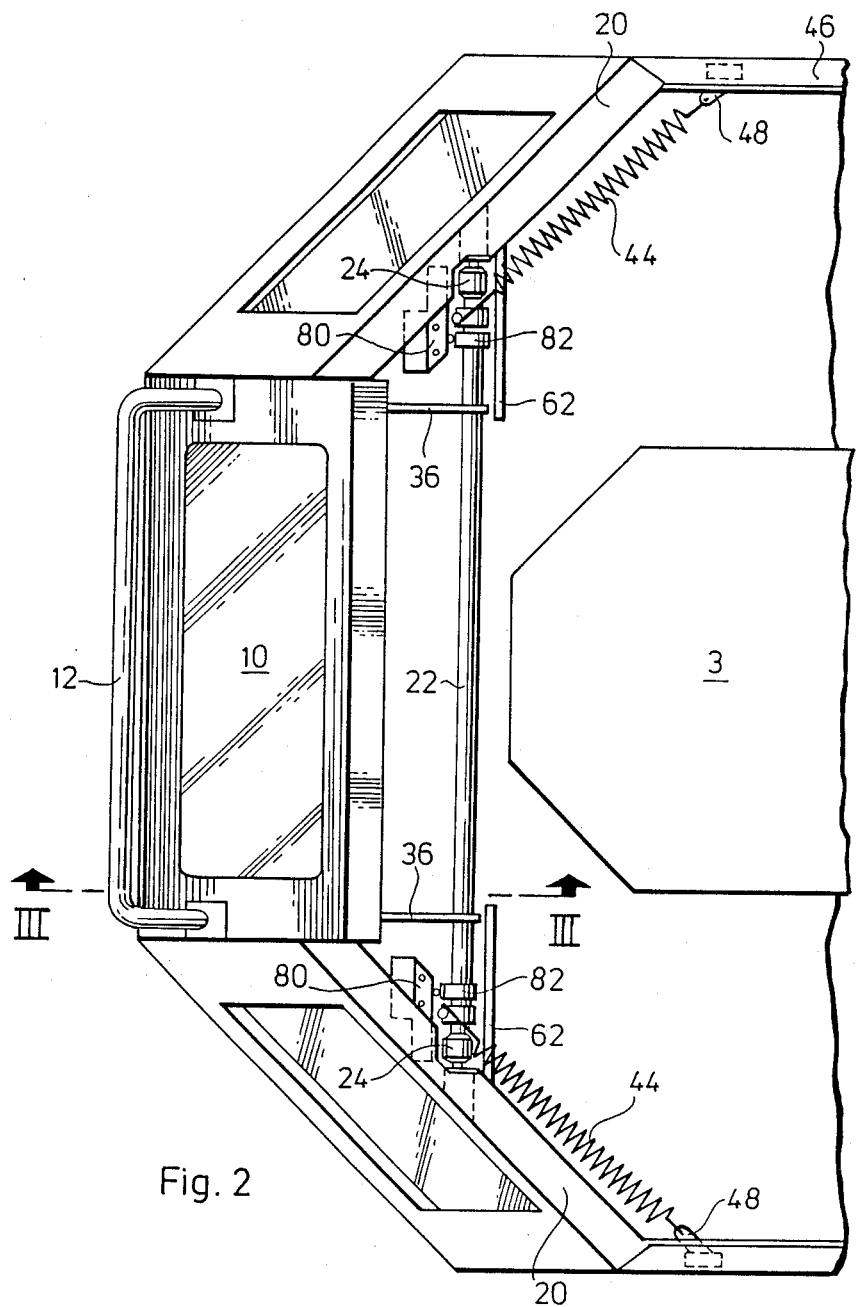
FIG. 2 shows a top view of the enclosure of the machine tool in the area of the charging door.

In FIG. 2, the headstock 3 is indicated only diagrammatically; the charging door 10 is in its closed position, i.e. in its first end position. The same applies also to FIG. 3. The following description refers to both FIGS. 2 and 3.

In the upper portion of the enclosure, a shaft 22 can be seen which is seated rotatably in a bearing 24 in stationary wall portions 20 of the enclosure 1. At about the middle of the height of the charging door 10, mountings 26, i.e. metal angles, on which the guide rods 28 of the first pair of guide rods are pivoted, respectively, are fixed on the stationary parts or walls 20 of the enclosure 1, in the direct neighborhood of the lateral edges of the charging door 10. In FIG. 2, the said lateral edges appear as upper and lower edges. The other end of the guide rod 28 is pivoted on a joint 32 at a frame portion 30 of the charging door 10 extending substantially perpendicularly to the plane of the charging door 10. In the first end position of the charging door 10, the guide rods 28 of the first pair of guide rods extend between the joint 29 and the joint 32 in downward and outward direction, at an angle of approximately 60° relative to the horizontal plane.

Further, two guide rods 36 of a second pair of guide rods are fixed against rotation on the shaft 22, in parallel relative to each other. The ends of the guide rods 36 facing away from the shaft 22 are connected with the frame portion 30 via joints 38. In the position shown in FIG. 3, the guide rods 36 extend between their pivot axis, which is formed by the shaft 22, and the joint 38 likewise in downward and outward direction, but at a somewhat flatter angle than the guide rods 28, namely at an angle of approximately 45° relative to the horizontal plane.

The shaft 22 carries in the area of each of its two ends a short lever arm 40 which is fixed against rotation and the other end of which forms a hook 42 in which the end of a helical tension spring 44 is nested undetachably. The other end of the spring 44 is fastened to a stationary part 46 of the enclosure 1, at a point 48. The spring 44 extends substantially in horizontal direction, somewhat below the upper edge of the enclosure 1, so that it is not seen from the outside. The arm 40 extends upwardly and to the left—as viewed in FIG. 3—while the spring 44 extends from the hook 42 to the right.

Figure 3:
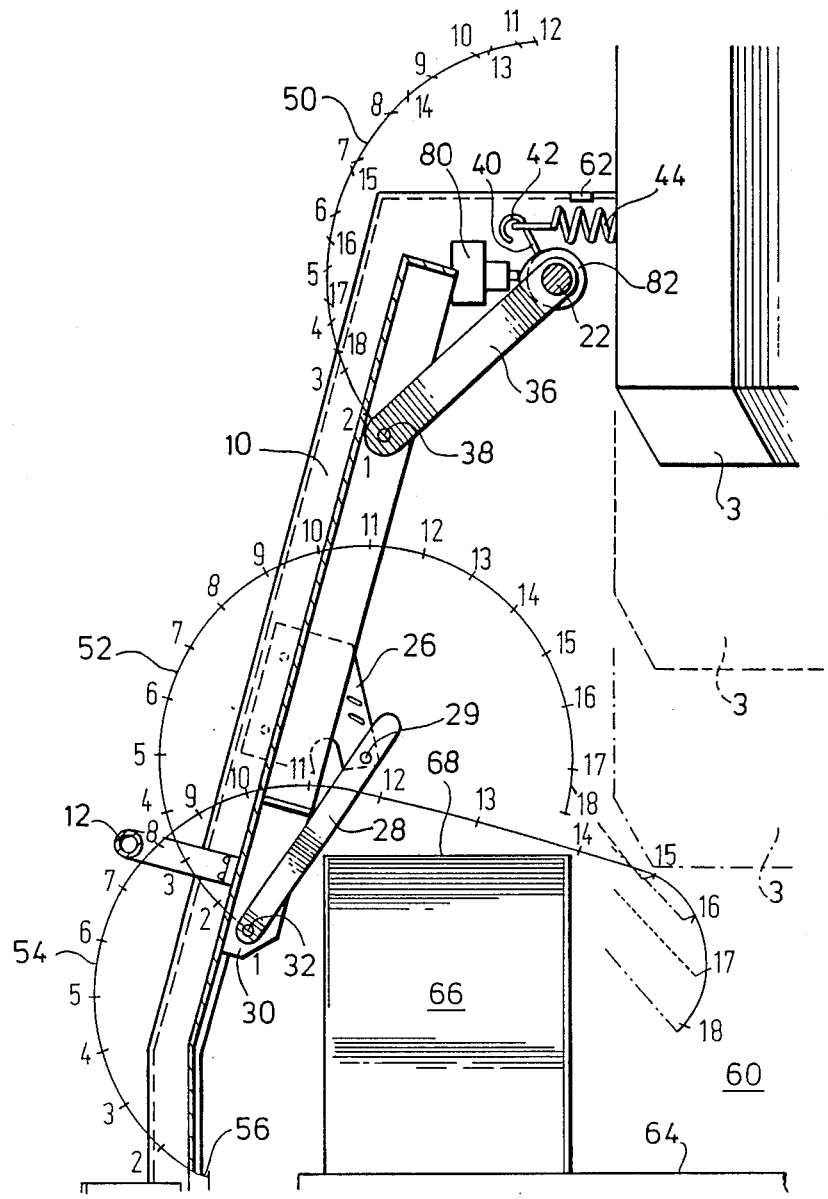
FIG. 3 shows a vertical section taken along line III—III in FIG. 2, illustrating the positions of the guide rods during movement of the charging door.

In FIG. 3, an arc of a circle 50 drawn about the axis of the shaft 22 and passing through the joint 38 and an arc of a circle 52 drawn about the joint 29 and passing through the joint 32, and in addition a curve 54 have been indicated. The curve 54 represents the path taken by a lower edge 56 of the door 10 when the charging door 10 is moved from its first end position shown in FIG. 3 into its second open end position. In this second end position, the charging door 10 occupies a position relative to the vertical plane extending perpendicularly to the plane of FIG. 3, in which the lower edge 56 of the door projects into the inner space of the enclosure 1.

In FIG. 3, marks 1 to 18 have been plotted on each of the curve 54 and the arcs 50 and 52. Every time the lower edge 56 of the charging door 10 finds itself in the position indicated by any of these imaginary marks, the joints 38 and 32, respectively, find themselves in the position of the marks with the same numbers on the curves 50 and 52, respectively. Accordingly, the joint performs a rotation about approximately 270° during movement of the charging door from its first (outer) end position into its second (inner) end position, while the joint 38 and, consequently, the guide rods 36 move initially in the same rotary sense as the guide rods 28, but only until the guide rods 36 occupy a substantially vertical position, as a stop 62 prevents the guide rods 36 from moving beyond the latter. Instead of the stop 62, other stops may be provided, such as those described further below in connection with FIG. 4 When the lower portion of the charging door 10 continues to be moved inwardly, i.e. to the right in FIG. 3, the pair of guide rods 36 will be caused to move again in counterclockwise direction—in the sense of marks 13 to 18 on curve 50. In its inner end position, the joint 38 therefore assumes a position which is somewhat displaced outwardly and upwardly, relative to the position illustrated in FIG. 3.

In the right portion of FIG. 3, it has been indicated by different dashed lines that the spindle head 3 can move downwardly into the position indicated by dash-dotted lines without there being a risk of collision between the spindle head and the charging door 10 in the latter's end position. Reference numeral 66 indicates a workpiece mounted on a machine table 64 of the machine tool which can be pivoted by 180° about a vertical axis. The upside 68 of the workpiece 66 is located at a higher level than the lower edge 56 of the charging door 10 in the first and in the second end position. Curve 54 shows that the charging door 10 can be moved between the two end positions without colliding with the workpiece 66.

The two springs 44 are shown in FIG. 3 in their maximally tensioned condition. When the charging door 10 is moved in upward direction, starting from the position shown in FIG. 3, the arm 40 turns in clockwise direction so that the spring 44, being designed as tension spring, can contract thereby releasing stored energy which acts to facilitate lifting of the charging door 10. This permits a power-operated drive of relatively low power to be used, as will be described in detail further below with reference to FIGS. 4 and 5. The spring 44 is in its minimally tensioned condition when the guide rods 36 are approximately in their vertical position. When the guide rods 36 then turn again in counterclockwise direction, as the charging door 10 continues to move, the springs 44 are tensioned again progressively thereby absorbing part of the potential energy stored in the door by the lifting process when the door as a whole starts to move down again in order to assume its second end position. It is, however, understood that in cases, where a power-operated drive is provided, as will be described hereafter in connection with FIGS. 4 and 5, the charging door 10 does not necessarily have to be equipped with springs 44, but that instead the actuating force of the drive may be adapted accordingly.

An electric limit switch 80 coacting with a cam disk 82 fixed on the shaft 22 detects the condition when the door 10 occupies its extreme end position. This is the only position in which the table of the machine tool may be rotated.

Figure 4:
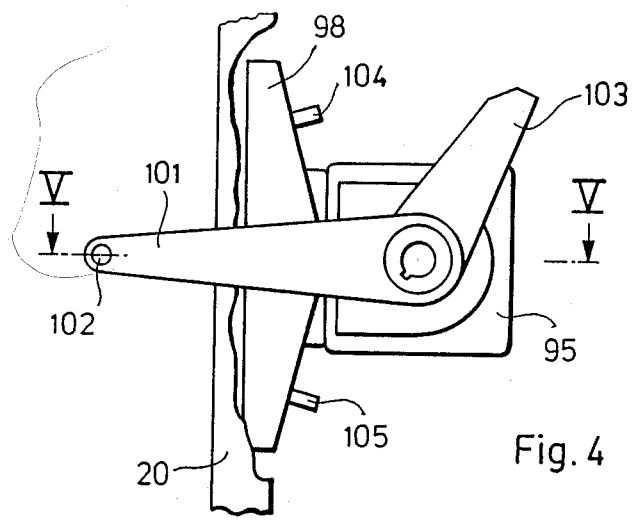
FIG. 4 shows a side view of a detail of a power-operated drive for pivoting a charging door.
Figure 5:
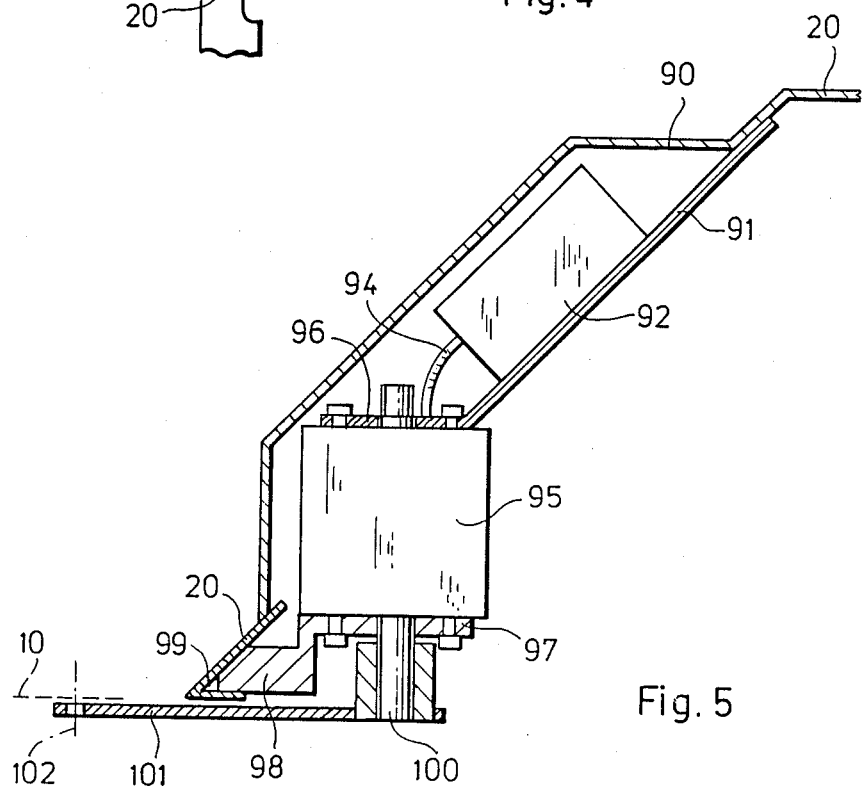
FIG. 5 is a section taken along line V—V in FIG. 4.

FIGS. 4 and 5 show two views of a power-operated drive of the type suited to ensure power-assisted actuation of the charging door 10.

It appears very clearly from FIG. 5 that the wall portion 20 is inclined forwardly and downwardly towards the charging door 10, as shown in FIGS. 1 and 2, and is additionally skewed at its upper end. The forward end of the wall portion 20, in the area of the opening for the charging door 10, is folded over to form a pointed edge.

In the case of the embodiment represented by FIGS. 4 and 5, a bay 90 of trapezoidal cross-section formed by a corresponding sheet steel cover can be seen in the area of the window in the wall portion 20 which can be seen best in FIGS. 1 and 2. Although the bay 20 may be formed integrally with the wall portion 20, it is preferred to design the bay 90, including the installations that will be described below, as a separate insert so that it can be installed in existing window openings of existing machines or in window openings of machines that are still to be produced, in order to equip them with a power-operated drive, without having to change the remaining design.

The window opening in the wall portion 20 covered by the bay 90 is spanned on the inside over a large portion of its width by a mounting plate 91. A section of the mounting plate 91 extending parallel to the window opening carries a control unit 92 for a power-operated drive. The control unit 92 may be an electric, electronic, hydraulic, pneumatic or other control unit, and the power-operated drive which will be described in detail further below may comprise an electric motor, a fluid motor or the like.

The control unit 92 is connected to a servomotor 95 via connection lines 94. The servomotor 95 is screwed by its rear end to a first flange 96 of the mounting plate 91. The first flange 96 extends parallel to the pivoting plane of the charging door 10. The opposite end face of the servomotor 95 is screwed to a second flange 97 extending parallel to the first flange 96 and ending in a beveled end piece 98 adjacent the servomotor 95. The beveled area of the end piece 98 fits into the pointed space 99 which, as has been described before, is formed at the forward edge of the wall portion 20 by folding over the latter in the area of the opening for the charging door 10.

A shaft 100 of the servomotor 95 extending perpendicularly relative to the pivoting plane of the charging door 10 carries at its free end a first actuating arm 101. The free end of the actuating arm 101 is hinged on the charging door 10 by means of a mounting element 102 indicated only diagrammatically in FIG. 5.

The shaft 100 carries in addition a second actuating arm 103 which, during the pivoting movement of the charging door 10, runs up against stops 104 and 105, respectively, in the two end positions. The stops 104, 105 may also be provided with limit switches for switching off the servomotor 95 when the end positions have been reached.

We claim:
1. A machine tool comprising:
a headstock;
a worktable;
displacement means for displacing said headstock relative to said worktable along horizontal and vertical coordinate directions;
a cover surrounding said headstock, said worktable and said displacement means, said cover comprising two symmetrical front wall portions tapering upwardly and, further, tapering forwardly towards a front opening for charging and discharging workpieces, said cover further having window openings in said front wall portions with one of said window openings being provided with a cover insert shaped as a bulge protruding from a respective one of said front wall portions to form a lateral bay, with a holder being arranged in said bay and having a mounting plate extending across said bay;
a door arranged in said front opening for closing said front opening in a first, closed end position of said door and for providing access to said worktable through said front opening in a second, opened end position of said door, said door having a lower rim with a lowermost edge;
swivel means for swivelling said door about a horizontal axis between said first and said second end positions such that said lower rim is guided during said swivelling with said lowermost edge being at a higher vertical level between said two end positions than in said two end positions, said swivel means further including power-operated drive means for swivelling said door, said drive means comprising a drive motor with a first shaft and a control unit, said drive motor and said control unit being attached to said holder and being arranged in said bay and on said mounting plate; and
an actuating arm connected to said first shaft for rotating therewith and being connected to said door for effecting said swivelling thereof when said drive motor is actuated by said control unit.

2. The machine tool of claim 1, further comprising:
a first pair of swivellable guide rods having first and second terminals, said first terminals being hinged to said door at a lower section thereof and said second terminals being hinged to said front wall portions at lower sections thereof;
a second pair of swivellable guide rods having third and fourth terminals, said third terminals being hinged to said door at an upper section thereof and said fourth terminals being hinged to said front wall portions at upper sections thereof; and
stationary stop means for limiting swivelling motion of said second pair of guide rods in an essentially vertical position thereof and for obtaining a forced inversion point for returning said swivelling motion of said second pair of guide rods while maintaining uninterrupted swivelling of said first pair of guide rods.

3. The machine tool of claim 2, wherein the guide rods comprising said first and second pairs of guide rods are of substantially equal length.

4. The machine tool of claim 1, further comprising a weight-relieving device acting upon said door.

5. The machine tool of claim 4, wherein said weight-relieving device comprises a spring.

6. The machine tool of claim 5, wherein said spring is biased between one of said front wall portions and a lever arm fixed against rotation on said second pair of guide rods.

7. The machine tool of claim 2, wherein the guide rods comprising said second pair of guide rods are fixed against rotation on a second shaft interconnecting said guide rods and seated in said front wall portions.

8. The machine of claim 1, wherein a limit switch is provided for detecting said second opened end position of said door, and limit switch being connected to said control unit.

* * * * *